(12) United States Patent
Lee et al.

(10) Patent No.: US 6,491,867 B1
(45) Date of Patent: Dec. 10, 2002

(54) HIGH CAPACITY AND HIGH PERFORMANCE ZR-BASED HYDROGEN STORAGE ALLOY FOR SECONDARY CELLS

(75) Inventors: Jai Young Lee, Taejeon (KR); Dong Myung Kim, Taejeon (KR); Jae Han Jung, Taejeon (KR); Ji Sang Yu, Taejeon (KR); Sang Min Lee, Taejeon (KR); Jeong Gun Park, Taejeon (KR); Ho Lee, Taejeon (KR)

(73) Assignee: Korea Advanced Institute of Science and Technology, Taejeon (KR)

( * ) Notice: Subject to any disclaimer, the term of this patent is extended or adjusted under 35 U.S.C. 154(b) by 366 days.

(21) Appl. No.: 09/105,183

(22) Filed: Jun. 26, 1998

(30) Foreign Application Priority Data

Jul. 16, 1997 (KR) ............................................. 97-33234

(51) Int. Cl.[7] ............................................ C22C 16/00
(52) U.S. Cl. ........................ 420/422; 420/900; 148/421; 429/418; 429/423; 429/424
(58) Field of Search ................................ 429/218, 223, 429/224; 420/900, 422; 148/421

(56) References Cited

U.S. PATENT DOCUMENTS

| | | | |
|---|---|---|---|
| 4,487,817 A | | 12/1984 | Willems et al. |
| 4,551,400 A | | 11/1985 | Sapru et al. |
| 4,728,586 A | | 3/1988 | Venkatesan et al. |
| 4,849,205 A | | 7/1989 | Hong |
| 4,946,646 A | | 8/1990 | Gamo et al. |
| 5,006,328 A | * | 4/1991 | Hong .......................... 423/644 |
| 5,278,001 A | * | 1/1994 | Ono et al. .................... 429/101 |
| 5,451,474 A | * | 9/1995 | Wu et al. ....................... 429/59 |
| 5,552,246 A | * | 9/1996 | Hong .......................... 429/218 |
| 5,556,719 A | * | 9/1996 | Hong et al. .................. 429/218 |
| 5,591,394 A | | 1/1997 | Lee et al. |
| 5,695,530 A | * | 12/1997 | Hong et al. ................. 29/623.1 |

FOREIGN PATENT DOCUMENTS

JP 61214361 A 9/1986
JP 61132501 A 1/1988

OTHER PUBLICATIONS

Rechargeable hydrogen batteries using rare–earth–based hydrogen storage alloys. T. Sakai et al. Journal of Alloys and Compounds, 180 (1992) 37–54 JAL 8078.
Degradation Process in a $LaNi_5$ Electrode. A.H. Boonstra et al. Journal of the Less–Comon Metals, 155 (1989) 119–131.
Electrode characteristics of C15–type Laves phase alloys. Y. Moriwaki, et al. Journal of the Less–Common Metals, 172–174 (1991) 1211–1218.
Preparation and Properties of Hydrogen Storage Alloy–copper Microcapsules. H. Ishikawa et al. Journal of the Less–Common Metals, 107 (1985) 105–110.
Effects of partial substitution and anodic oxidation treatment of Zr–V–Ni alloys on electrochemical properties. S. Wakao and H. Sawa. Journal of the Less–Common Metals, 172–174 (1991) 1219–1226.
Rare–earth–based alloy electrodes for a nickel–metal hydride battery. T. Sakai et al. Journal of the Less–Common Metals, 172–174 (1991) 1175–1184.
Some Factors Affecting the Cycle Lives of $LaNi_5$–based Alloy Electrodes of Hydrogen Batteries. Tetsuo Sakai et al. Government Industrial Research Institute, Osaka, Midorigoaoka, Ikeda, Osaka 563 Japan.

* cited by examiner

Primary Examiner—John Sheehan
(74) Attorney, Agent, or Firm—Birch, Stewart, Kolasch & Birch, LLP

(57) ABSTRACT

A hydrogen storage alloy, represented by the following formula I which is suitable for use as an active anode material for ni-metal hydride secondary cells by virtue of its high discharge characteristics including, for example, a discharge capacity ranging from approximately 300 to 400 mAh/g and a rate capability of at least 80%;

$$Zr_{1-x}ti_x(Mn_uV_vNi_y)_z \qquad \text{I}$$

wherein, x, u, v, and z each represent an atom fraction under the condition of: $0 < x \leq 0.2$, $1.5 \leq u \leq 0.7$, $0.5 \leq v \leq 0.7$, $1.0 \leq y \leq 1.4$, and $0.84 \leq z \leq 1.0.1$.

6 Claims, 10 Drawing Sheets

HIGH CAPACITY AND HIGH PERFORMANCE ZR-BASED HYDROGEN STORAGE ALLOY FOR SECONDARY CELLS

BACKGROUND OF THE INVENTION

1. Field of the invention

The present invention relates to a high capacity and high performance Zr-based hydrogen storage alloy for secondary cells. More particularly, the present invention relates to a Zr-based hydrogen storage alloy for use as an active anode material for Ni-metal hydride (MH) secondary cells.

2. Description of the Prior Art

A Ni—MH secondary cell employing a hydrogen storage alloy as the active material of its anode, functions according to the following reaction principle. Upon the discharge of the cell, hydrogen atoms within the hydrogen storage alloy combine with the hydroxide ions (OH$^-$) in a KOH electrolyte to produce water while releasing electrons from the hydrogen atoms via an external circuit to the cathode. On the other hand, upon the charge of the cell, water is decomposed into hydrogen ions (H$^+$) and hydroxide ions (OH$^-$). These hydroxide ions remain in the electrolyte whereas the hydrogen ions combine with the electrons introduced from outside of the electrode to produce hydrogen atoms which are then stored in the alloy, In principle, a Ni—MH secondary cell takes advantage of the hydrogen storage alloy's characteristic properties, including stability in alkali solutions and ability to rapidly absorb and release hydrogen, reversibly.

There are two requirements which hydrogen storage alloys must meet in order for them to be used as active anode materials for N—MH secondary cells. First, they must have hydrogenation reaction properties, including a hydrogen absorption-release pressure suitable for gas-solid reaction (ordinary, 0.01–1 atm at room temperature), a high hydrogen storage capacity (the theoretical discharge capacity of an electrode is proportional to hydrogen storage capacity ($C_H$ wt %): theor. capa. (mAh/g)=268×$C_H$), and rapid hydrogenation speed. Second, upon the electrochemical reaction of the alloys with KOH electrolytes, the charge transfer reaction, which is closely correlated with the decomposition and synthesis of hydrogen, must readily occur at the interface between the alloys and the electrolyte. That is, the surfaces of the alloys must perform the catalytic function of the charge transfer reaction.

Today, many hydrogen storage alloys have been developed to have the above properties. They can be divided largely into two groups: $AB_5$ and $AB_2$ types. Representative $AB_5$ type includes La—Nd—Ni—Co—Al (see, U.S. Pat. No. 4,487,817) and Mm—Mn—Ni—Co—Al (Jap. Pat. Publication Nos. 61-132,501 and 61-214,361), both in hexagonal structure. As those belonging to $AB_2$ type, Ti—V—N—Cr, a C14, 15-hexagonal, BCC multi-phase t. structure, (see, U.S. Pat. No. 4,551,400), Zr—V—Ni, a C14 structure (see, J. of the Less-Common Metals, 172–174:1219(1991)), and Zr—Cr—Mn—Ni, a C14, 15 structure (refer to supra, 1211(1991)) are exemplified.

Of them, the La—Ni electrodes of $AB_5$ type are found to show that their electrode capacities are significantly decreased as the cycle of charge and discharge goes on (see, J. of the Less-Common Metals, 161:193 (1990) and 155:119 (1989)). This phenomenon, so-called "degradation", can be solved in the alloy of U.S. Pat. No. 4,487,817 to J. J. G. Willems et al., in which the Ni element is partially replaced by Co and Al and the La element partially by Nd. This technique suggested can improve the life span of the electrode, but causes a decrease in discharge capacity.

Separately, a method of electroless plating Cu on hydrogen storage alloy powders was disclosed in J. of the Less-Common Metals, 107:105(1985), whereby the electrodes can be improved in life span without reduction in capacity. However, this method is complicated and produces pollution of the environment on account of the plating processes and reagents used.

It is now found that $AB_5$ type hydrogen storage alloys show a discharge capacity limit to approximately 300 mAh/g whereas $AB_2$ type hydrogen storage alloys have a discharge capacity greater than 300 mAh/g. In addition, the $AB_2$ type hydrogen storage alloys are also found to be of superior cycle life span even though no plating process is performed (see, J. of the Less-Common Metals, 172–174:1175(1991) and 180:37(1992)).

Zr-based hydrogen storage alloys with a discharge capacity of 300–370 mAh/g, which comprise at least 30 wt % of Zr element and at least 40 wt % of Ni element, are disclosed in U.S. Pat. No. 4,946,646 by T. Gamo et al.

Ti—Zr—V—Ni—Cu—Mn—M (M=Al, Co, Fe, etc.) hydrogen storage alloys ranging, in discharge capacity, from 300 to 380 mAh/g are disclosed in U.S. Pat. No. 4,849,205 by K. Hong and in U.S. Pat. Nos. 4,728,586 and 4,551,400 by M. A. Fechenko et al.

These conventional hydrogen storage alloys are disadvantageous in that their rate capability abruptly deteriorates as the discharge current density increases.

SUMMARY OF THE INVENTION

Intensive and thorough research repeated by the present inventors aiming to overcome the above problems encountered in the prior Zr-based hydrogen storage electrodes resulted in the finding that a modified Zr—Mn—V—Ni quaternary alloy, in which the Zr is partially replaced by Ti and the other elements are optionally adjusted, has great hydrogen storage ability and a high discharge capability.

It is therefore an object of the present invention to provide a high capacity and high performance Zr-based hydrogen storage alloy, which is suitable for use as an active anode material for Ni—MH secondary cells.

In accordance with the present invention, there is provided a hydrogen storage alloy for Ni—MH secondary cells, represented by the following formula I:

$$Zr_{1-x}Ti_x(Mn_uV_vNi_y)_z \qquad \text{I}$$

wherein, x, u, v, y and z each represent an atom fraction under the condition of: 0<x ≤0.2, 0.5≤u≤0.7, 0.5≤v≤0.7, 1.0≤y≤1.4, and 0.84≤z≤1.0.

BRIEF DESCRIPTION OF THE DRAWINGS

The above and other objects and aspects of the present invention will become apparent from the following description of embodiments with reference to the accompanying drawings in which.

DETAILED DESCRIPTION OF THE INVENTION

Figure 1:
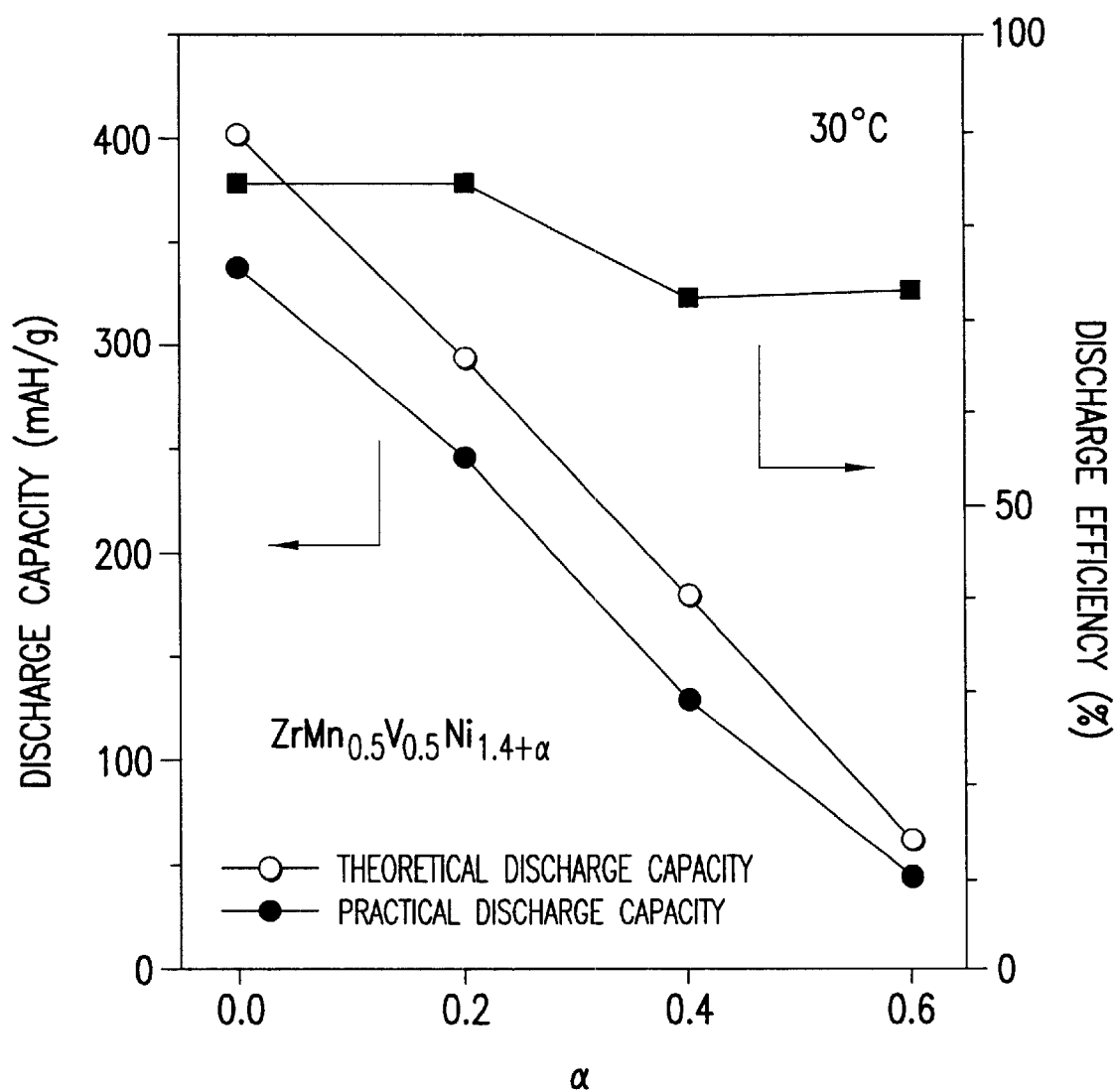
FIG. 1 is a graph showing the theoretical discharge capacity, the practical discharge capacity at a discharge current density ($i_d$) of 25 mA/g, and the discharge efficiency, plotted with respect to the atom fraction of Ni in alloys ZrMn$_{0.5}$V$_{0.5}$Ni$_{1.4+a}$.

The present invention pertains to a Zr-based hydrogen storage alloy comprising Ti element. In principle, it is a quaternary element alloy consisting of Zr, Mn, V and Ni wherein the Zr is partially replaced by Ti.

In the composition of the alloy, Zr is a base element present in an amount ranging, in atom fraction, between 0.8 and 1.

Ti plays an important role of increasing the rate capability in the hydrogen storage alloy. Preferably, its atom fraction in the composition is over zero in amounts up to 0.2. For example, its atom fraction is out of the range, the discharge capacity decreases down 300 mAh/g.

As for Ni element, it is responsible of the catalytic function of the alloy in KOH electrolyte. Its atomic fraction in the composition ranges from 0.84 to 1.4 and preferably from 1.0 to 1.4.

The Mn element ranges, in atom fraction, from 0.42 to 0.7 and preferably from 0.5 to 0.7. For example, if the atom fraction of Mn is below 0.42, the reversible hydrogen storage capacity of the resulting alloy is largely diminished. On the other hand, if the atom fraction of Mn exceed 0.7, the catalytic function of the alloy is reduced because the atom fraction of Ni is relatively decreased.

Like Mn, V ranges, in atom fraction, from 0.42 to 0.7 and preferably from 0.5 to 0.7.

Therefore, the hydrogen storage alloy of the present invention is represented by the following formula I:

$$Zr_{1-x}Ti_x(Mn_uV_vNi_y)_z \qquad I$$

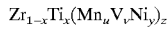

wherein, x, u, v, y and z each represent an atom fraction under the condition of: $0<x\leq 0.2$, $0.5\leq u\leq 0.7$, $0.5\leq v\leq 0.7$, $1.0\leq y\leq 1.4$, and $0.84\leq z\leq 1.0$.

Concrete examples of the Zr-based hydrogen storage alloy according to the present invention, include $Zr_{0.9}Ti_{0.1}(Mn_{0.7}V_{0.5}Ni_{1.2})_{0.95}$, $Zr_{0.9}Ti_{0.1}(Mn_{0.7}V_{0.5}Ni_{1.2})_{0.92}$, $Zr_{0.9}Ti_{0.1}(Mn_{0.7}V_{0.5}Ni_{1.2})_{0.88}$, $Zr_{0.9}Ti_{0.1}(Mn_{0.7}V_{0.5}Ni_{1.2})_{0.84}$, $Zr_{0.9}Ti_{0.1}(Mn_{0.7}V_{0.5}Ni_{1.2})$, $Zr_{0.85}Ti_{0.15}(Mn_{0.7}V_{0.5}Ni_{1.2})$, and $Zr_{0.8}Ti_{0.2}(Mn_{0.7}V_{0.5}Ni_{1.2})$ with the most preference to $Zr_{0.9}Ti_{0.1}(Mn_{0.7}V_{0.5}Ni_{1.2})_{0.92}$.

The experiment data obtained show the superiority of the hydrogen storage alloy according to the present invention in discharge characteristics. For example, it ranges, in discharge capacity, from approximately 300 to 400 mAh/g and has a rate capability of at least 80% at 400 mA/g on the basis of the discharge capacity at 25 mA/g.

A better understanding of the present invention may be obtained through the following examples which are set forth to illustrate, but are not to be construed as the limit of the present invention.

EXAMPLE I

Hydrogen Storage Alloy's Production & Hydrogenation Properties in Gas-Solid Reaction The element components for hydrogen storage alloys were each weighed according to their atomic ratios in the formulations of the hydrogen storage alloys 5 g in total weight and then, subjected to arc-melting under an argon atmosphere. After being solidified, the specimens thus obtained were turned over and remelted four or five times in order to improve their homogeneity. They were pulverized and powders with a size of approximately 100–200 mesh were selected and placed in a reaction tube connected to a Sievert's type high pressure hydrogen injector.

An activation treatment was done in such a way that, after being maintained at a vacuum of approximately $10^{-2}$ torr for 30 min, the pressure of the reaction tube was raised to approximately 20 atm with hydrogen. Within one hour postactivation, hydrogen absorption was completed. Again, a vacuum was produced in the reaction tube to release all of the hydrogens present within the specimens. Such a hydrogen desorption-release procedure was repeated three or four times, so that the hydrogen desorption-release could be completed within several minutes.

After the completion of the activation, the hydrogen injector including the reaction tube was constantly maintained at a predetermined temperature with the aid of an automatic temperature controller. At the temperature, PCT curves were figured according to the hydrogen contents in the alloy powders upon hydrogen desorption-release. From the PCT curves, the thermodynamic properties of the alloys were obtained.

EXAMPLE II

Hydrogen Storage Alloy Electrode's Production & Properties in Alkali Electrolytes Electrodes were produced by pulverizing the alloys of Example I to a size of 400 mesh, mechanically mixing the powders with 50 wt % of Cu powder and molding the mixture under a pressure of 10 ton/cm². The electrodes each were dipped in a 30 wt % KOH electrolyte, together with a counter electrode of platinum or nickel. An electrical field was provided at a current density of 100 mA/g for 6 hours across the two electrodes, so as to inject hydrogens in the alley electrode. Upon discharge, a current was flowed in the reverse direction until the cell reached an end potential of −0.75 V. At that moment, as a reference electrode for measuring the potential of the hydrogen storage alloy electrode, a mercury oxide electrode (Hg/HgO), a kind of saturated calomel electrode, was used.

The discharge capabilities of the alloy electrodes were measured by using a battery test unit, commercially available from Toyo system, Japan, identified as Toscat 4-3000U, and represented in ampere capacity per weight of the alloy electrodes when discharging them at a constant current rate.

Based on the discharge capacity at a discharge current density of 25 mA/g, the alloy electrodes' rate capabilities were calculated. Discharge efficiency is the ratio of practical discharge capacity to theoretical discharge capacity.

COMPARATIVE EXAMPLE I

Property Analysis of Alloys $ZrMn_{0.5}V_{0.5}Ni_{1.4+a}$

I-1: Discharge Capacity and Discharge Efficiency of $ZrMn_{0.5}V_{0.5}Ni_{1.4+a}$ Alloys $ZrMn_{0.5}V_{0.5}Ni_{1.4+a}$ ($\alpha$=0.0, 0.2, 0.4, 0.6) were calculated for theoretical discharge capacity at 30° C. and measured for practical discharge capacity at a current density ($i_d$) of 25 mA/g. From these values, the discharge efficiencies of the alloys were obtained. These data are plotted with regard to the values of a in FIG. 1. As seen, all theoretical discharge capacity, practical discharge capacity and capacity efficiency decrease as the atom fraction of Ni increases.

I-2: Volume Expansion and Hardness of Alloys $ZrMn_{0.5}V_{0.5}Ni_{1.4+a}$

Alloys $ZrMn_{0.5}V_{0.5}Ni_{1.4+a}$ (a =0.0, 0.2, 0.4, 0.6) were tested for volume expansion attributed to the hydrogens which were penetrated into the alloys upon hydrogenation and for hardness after the volume expansion. The hardness has inverse relation with the ductility of the alloys, an ability to bear the stress occurring owing to the volume expansion within the alloys.

In relation to measurement, an X ray diffraction analyzer, commercially available from Rigaku, Japan, identified as Model D/MAX-PC, was used for the volume expansion and a microhardness tester, commercially available from Wilson, U.S.A., identified as Model Tukon, was used for the hardness.

Figure 2:
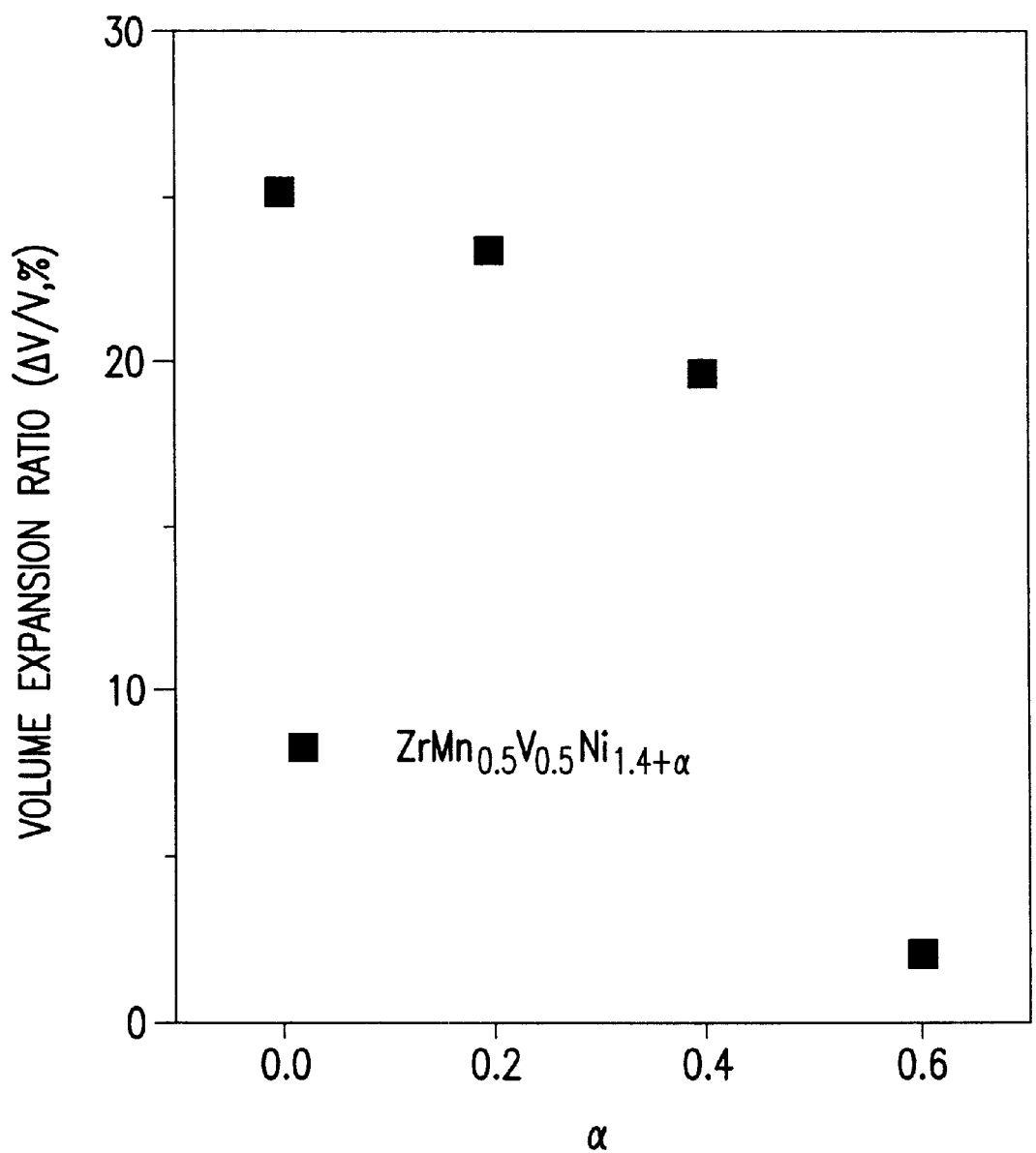
FIG. 2 is a graph showing the relation of the coefficient of volume expansion ratio with the atom fraction of Ni in alloy ZrMn$_{0.5}$V$_{0.5}$Ni$_{1.4+a}$.
Figure 3:
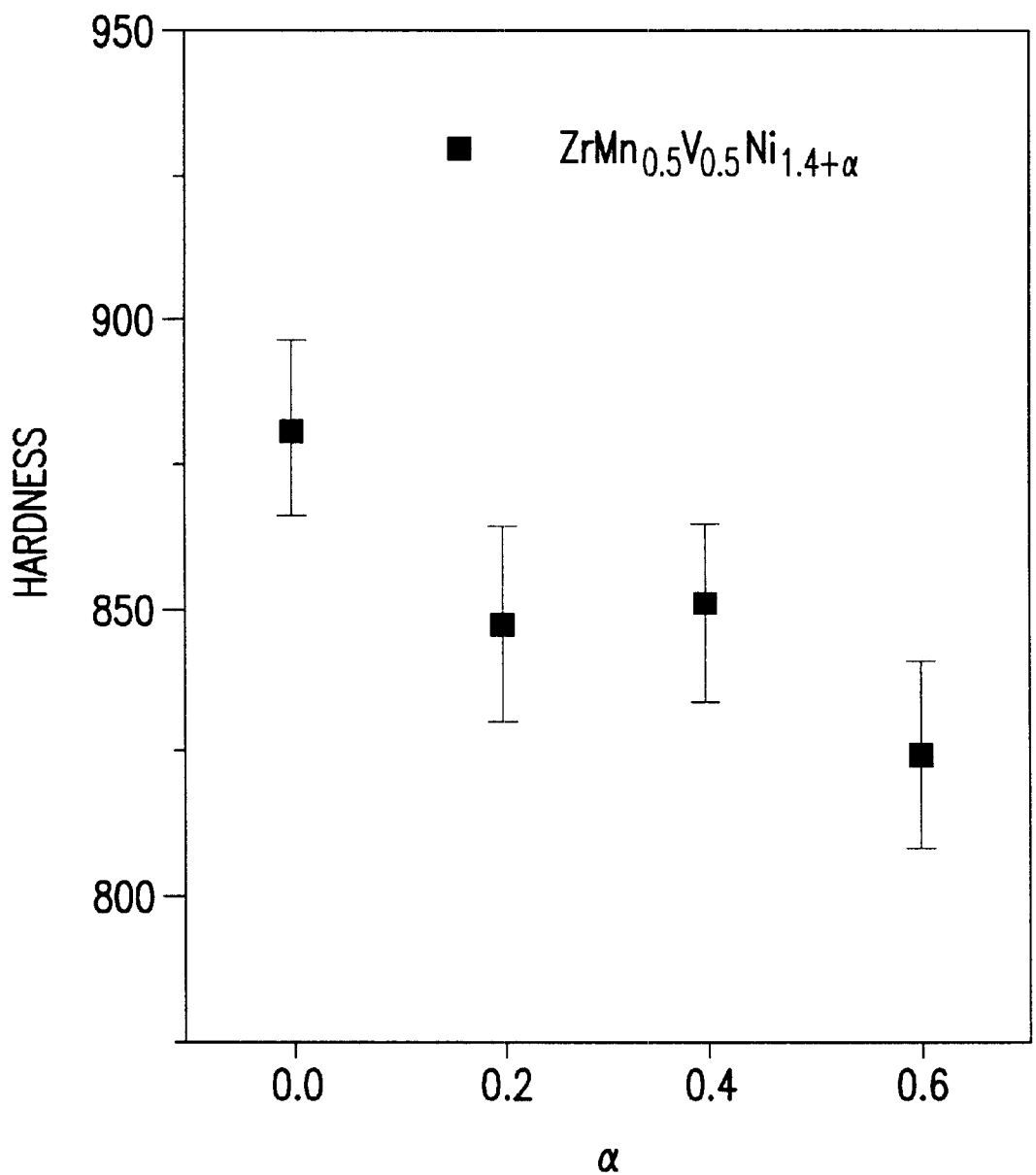
FIG. 3 is a graph showing the hardness of alloy ZrMn$_{0.5}$V$_{0.5}$Ni$_{1.4+a}$, 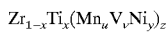 plotted with regard to the atom fraction of Ni.

FIGS. 2 and 3 show the volume expansion and hardness of the alloys. The data of the hardness were obtained by measuring at least 10 times per sample at different sites optionally selected and by averaging the measurements. The standard deviations are also shown in FIG. 3.

As seen in FIG. 2, the coefficient of volume expansion ($\Delta V/V$) decreases as the atom fraction of Ni increases, which indicates that the hydrogen storage capacity of the alloys, proportional to their discharge capacity, is lowered. The data of FIG. 3 show that the hardness of alloys $ZrMn_{0.5}V_{0.5}Ni_{1.4-a}$ decreases as the atom fraction of Ni increases.

COMPARATIVE EXAMPLE II

Properties of Alloys $ZrMn_{0.5+x}V_{0.5}Ni_{1.4-x}$

II-1: Discharge Capacity & Discharge Capability

Figure 4:
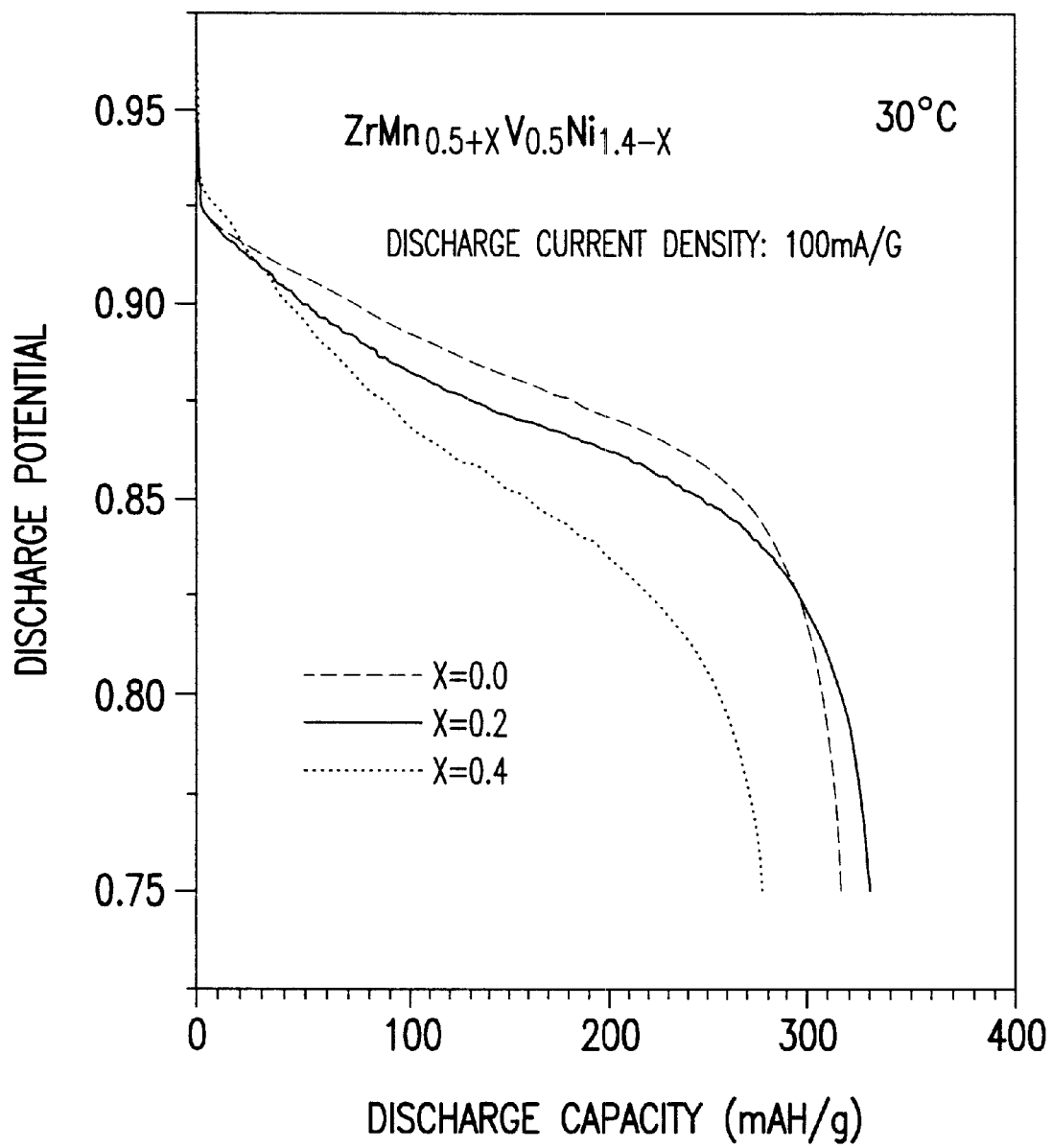
FIG. 4 is a graph showing the change of the potentials of alloys $ZrMn_{0.5+x}V_{0.5}Ni_{1.4-x}$ with their discharge capacities at 30° C. when discharging them at a discharge current density of 100 mA/g.
Figure 5:
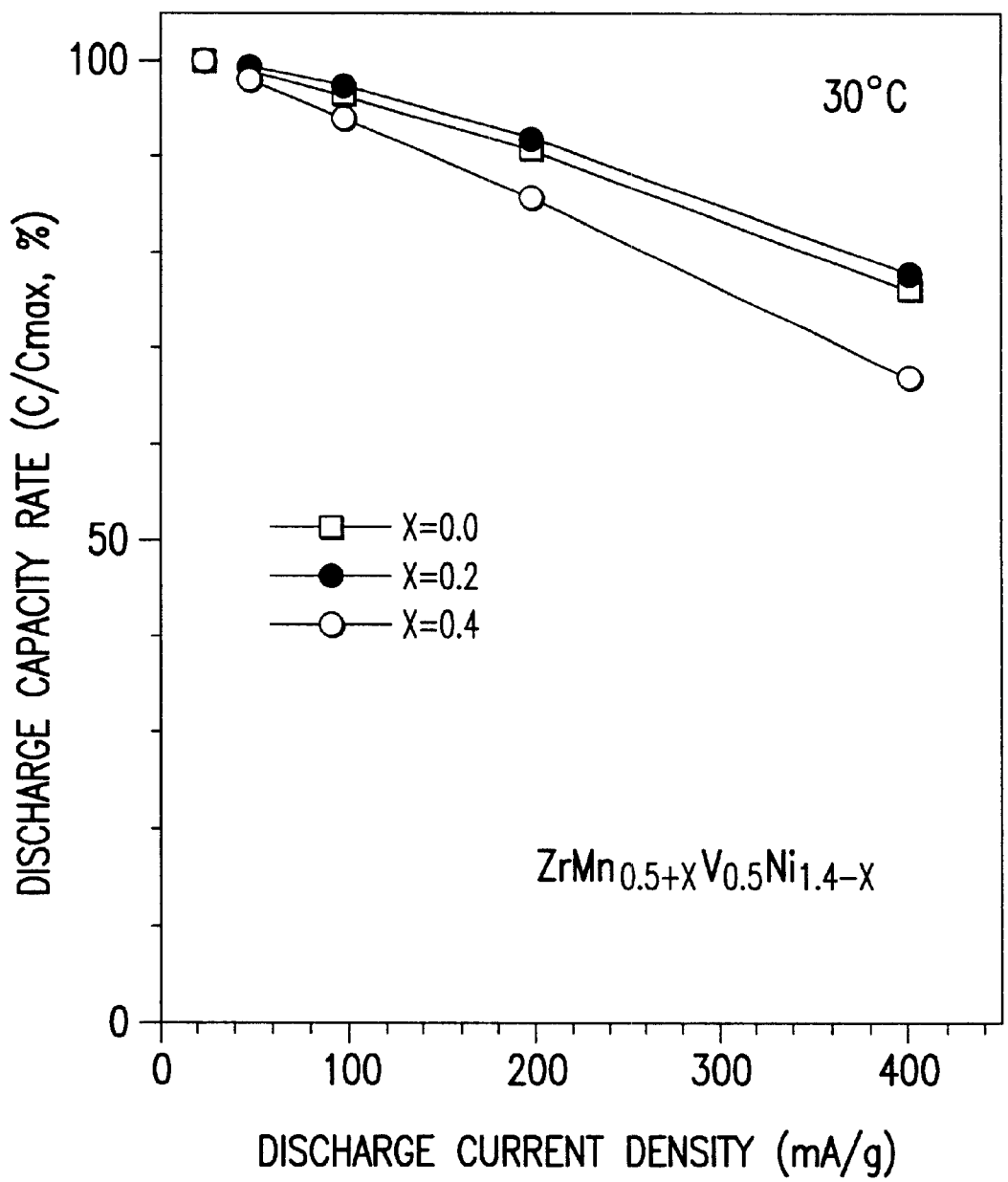
FIG. 5 is a graph showing the rate capabilities of alloys $ZrMn_{0.5+x}V_{0.5}Ni_{1.4-x}$, plotted with respect to discharge current density at 30° C.

In order to improve the discharge capacity and discharge capability of the alloys having a base composition of $ZrMn_{0.5}V_{0.5}Ni_{1.4}$, on the basis of the result of Comparative Example I-1, alloys comprising smaller atom fractions of Ni were prepared by partly replacing the Ni element with the Mn element. The alloys $ZrMn_{0.5+x}V_{0.5}Ni_{1.4-x}$ (x=0.0, 0.2, 0.4) thus obtained, were measured for discharge capacity and discharge capability at 30° C. at a discharge current density of 100 mA/g and the results are given as shown in FIGS. 4 and 5, respectively.

Taken together, the data show that the highest discharge capacity and discharge capability can be obtained when x is 0.2, that is, the atom fraction of Mn is 0.7.

II-2 Hardness and Catalytic Activity

Figure 6:
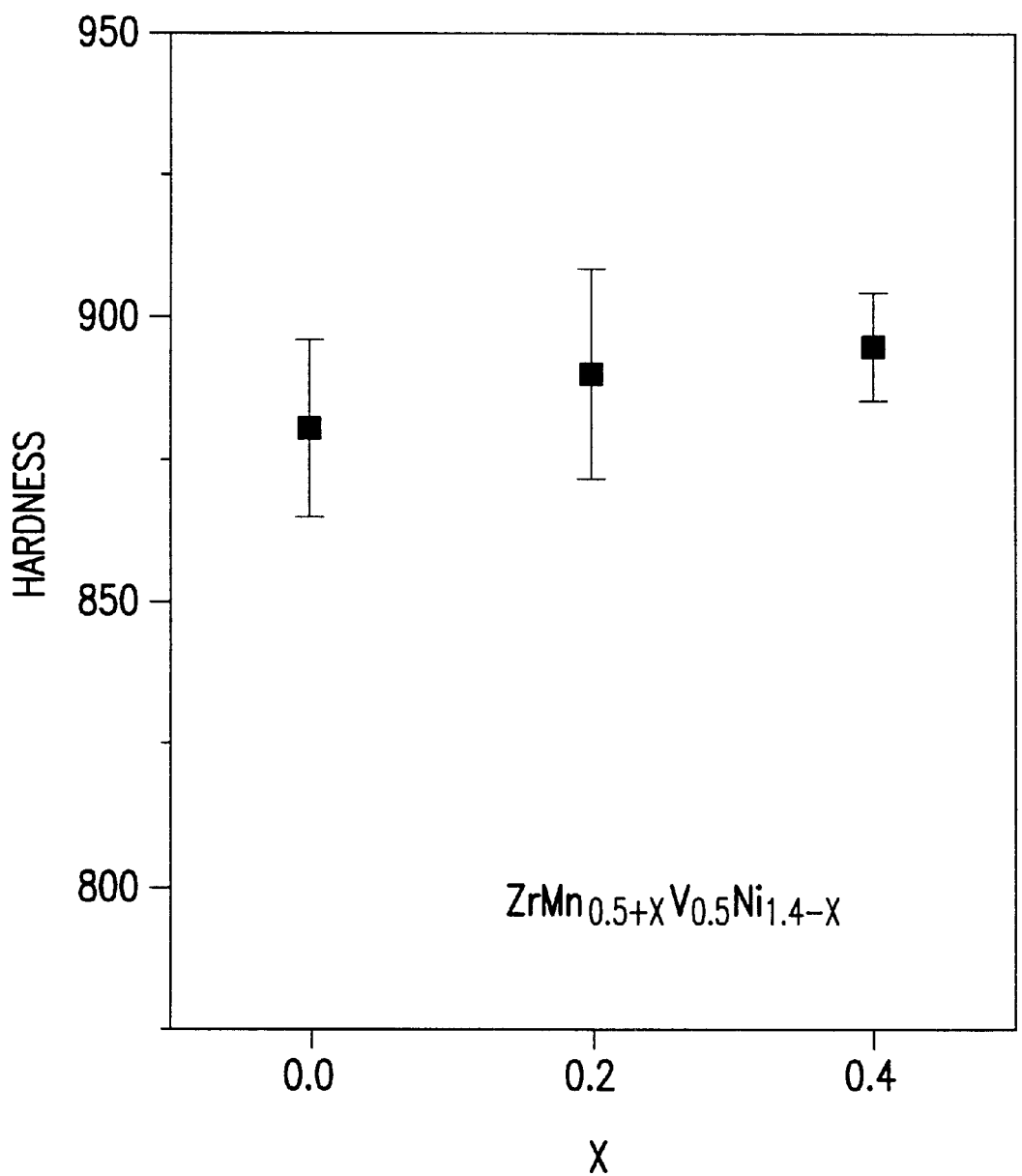
FIG. 6 is a graph showing the hardness of alloys $ZrMn_{0.5+x}V_{0.5}Ni_{1.4-x}$.

The hardnesses of alloys $ZrMn_{0.5+x}V_{0.5}Ni_{1.4-x}$ (x=0.0, 0.2, 0.4) was measured and the results are given as shown in FIG. 6. It is apparent that the hardness and coefficient of volume expansion increase with the atom fraction of Mn and these data enable one to expect that the specific reaction area of alloy surface becomes improved as the atom fraction of Mn increases.

Figure 7:
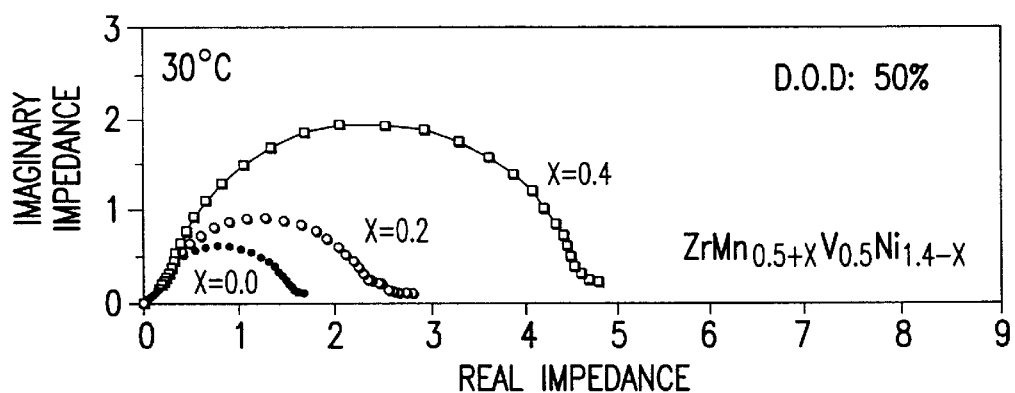
FIG. 7 shows the electrochemical impedance spectroscopy (EIS) analysis for alloys $ZrMn_{0.5+x}V_{0.5}Ni_{1.4-x}$ at 30° C. at 50% death of discharge (D.O.D)

The alloys $ZrMn_{0.5+x}V_{0.5}Ni_{1.4-x}$ (x=0.0, 0.2, 0.4) were measured for catalytic activity per area. For this, electrochemical impedance spectroscopy analysis was done at 30° C. at 50% death of discharge (D.O.D) and the result is shown in FIG. 7. As seen, the resistance to charge transfer reaction increases as the atom fraction of Mn increases.

As apparent from the data obtained, the increase of the atom fraction of Mn in the alloys $ZrMn_{0.5+x}V_{0.5}Ni_{1.4-x}$ allowed the specific reaction area to increase but reduced the catalytic activity per area on account of the relatively diminished atom fraction of Ni. It was found that optimal properties could be obtained when the atom fractions of Mn and Ni were 0.7 and 1.2, respectively, that is, in an alloy $ZrMn_{0.7}V_{0.5}Ni_{1.2}$.

EXAMPLE III

Properties of Alloys $Zr_{1-x}Ti_xMn_{0.7}V_{0.5}Ni_{1.2}$

Figure 8:
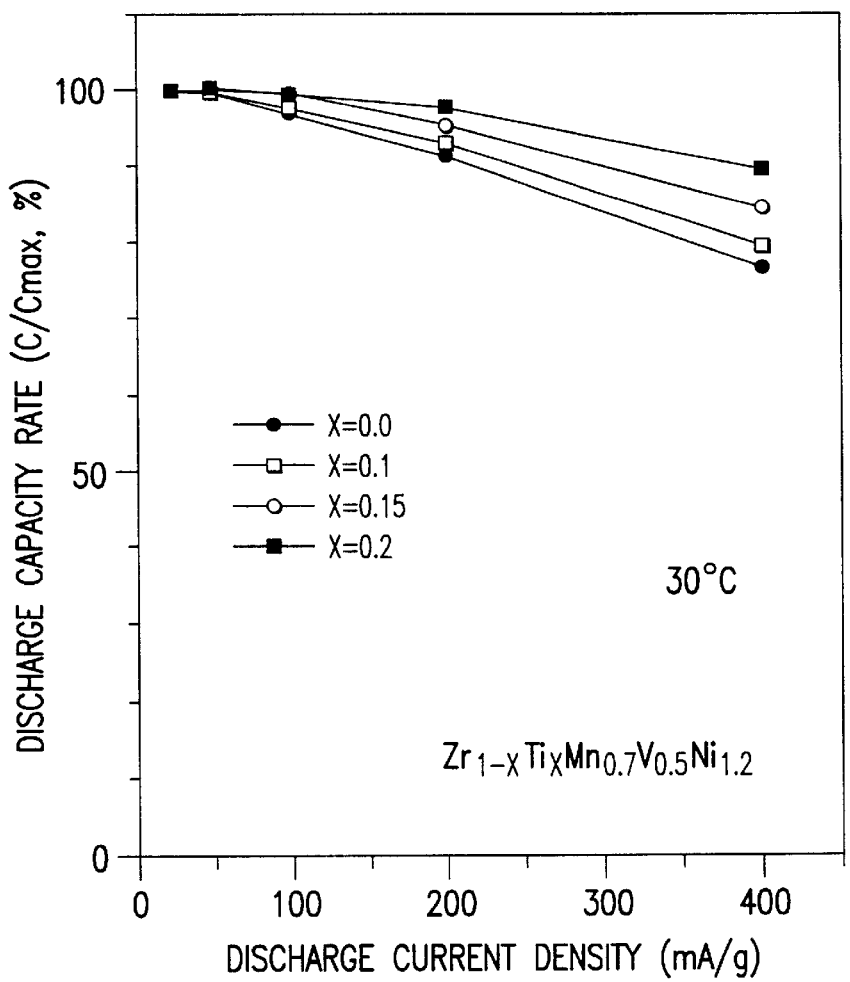
FIG. 8 is a graph showing the rate capabilities of alloys $Zr_{1-x}Ti_xMn_{0.7}V_{0.5}Ni_{1.2}$, plotted with respect to discharge current density at 30° C.
Figure 9:
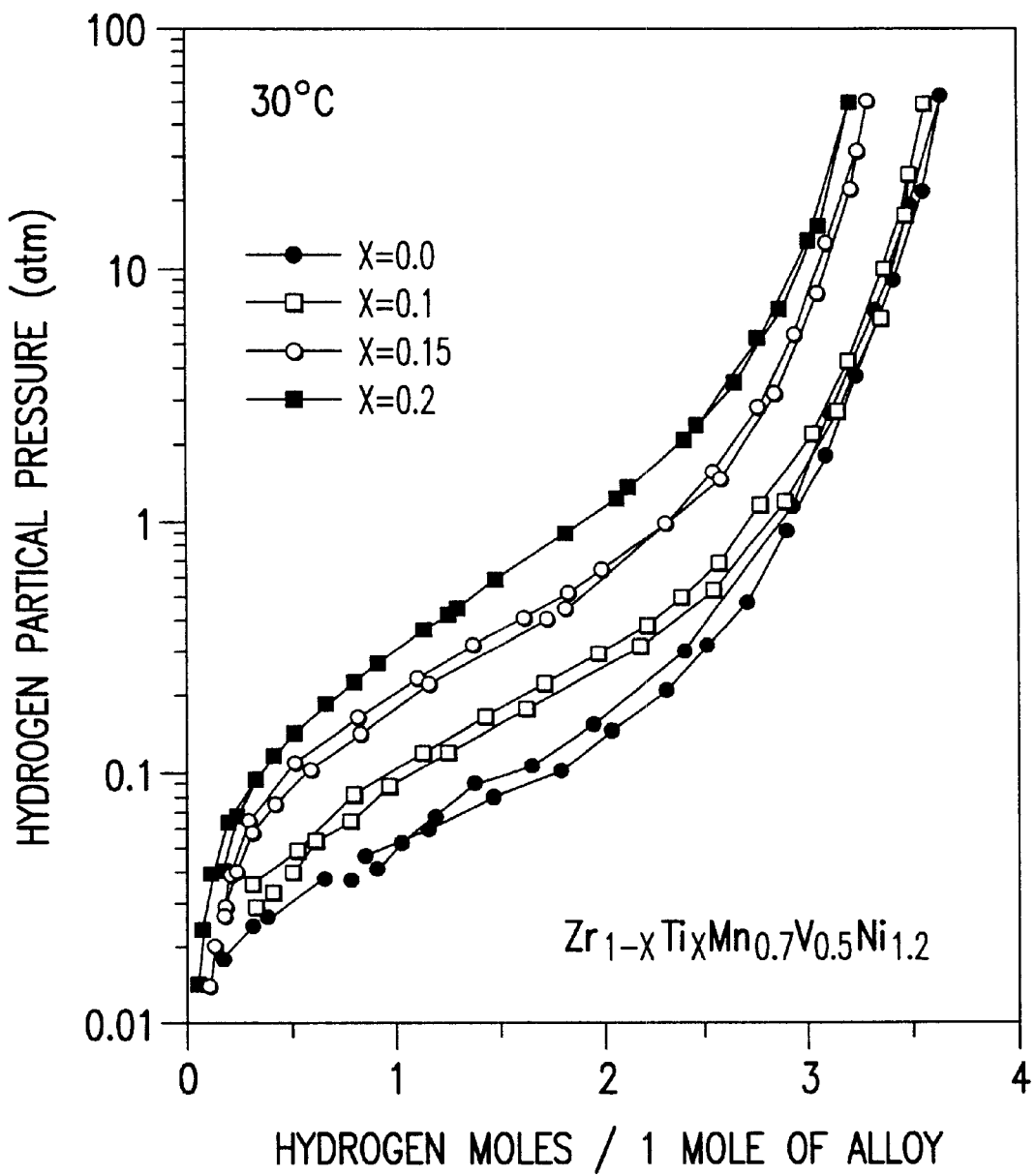
FIG. 9 is the PCT curves of alloys $Zr_{1-x}Ti_xMn_{0.7}V_{0.5}Ni_{1.2}$ at 30° C.

Novel alloys were prepared by partially replacing a light element Ti for the Zr element in the alloy $ZrMn_{0.7}V_{0.5}Ni_{1.2}$ optimally formulated in Comparative Example II. The alloys $Zr_{1-x}Ti_xMn_{0.7}V_{0.5}Ni_2$ (x=0.0, 0.1, 0.15, 0.2) were measured for discharge capability and used to draw PCT curves. The results are given as shown in FIGS. 8 and 9, respectively. As seen, the discharge capability and the hydrogen storage capacity and equilibrium pressure all increase with the amount of Ti in the alloys. However, the hydrogen storage capacity which is reversibly available in practice, is decreased.

Figure 10:
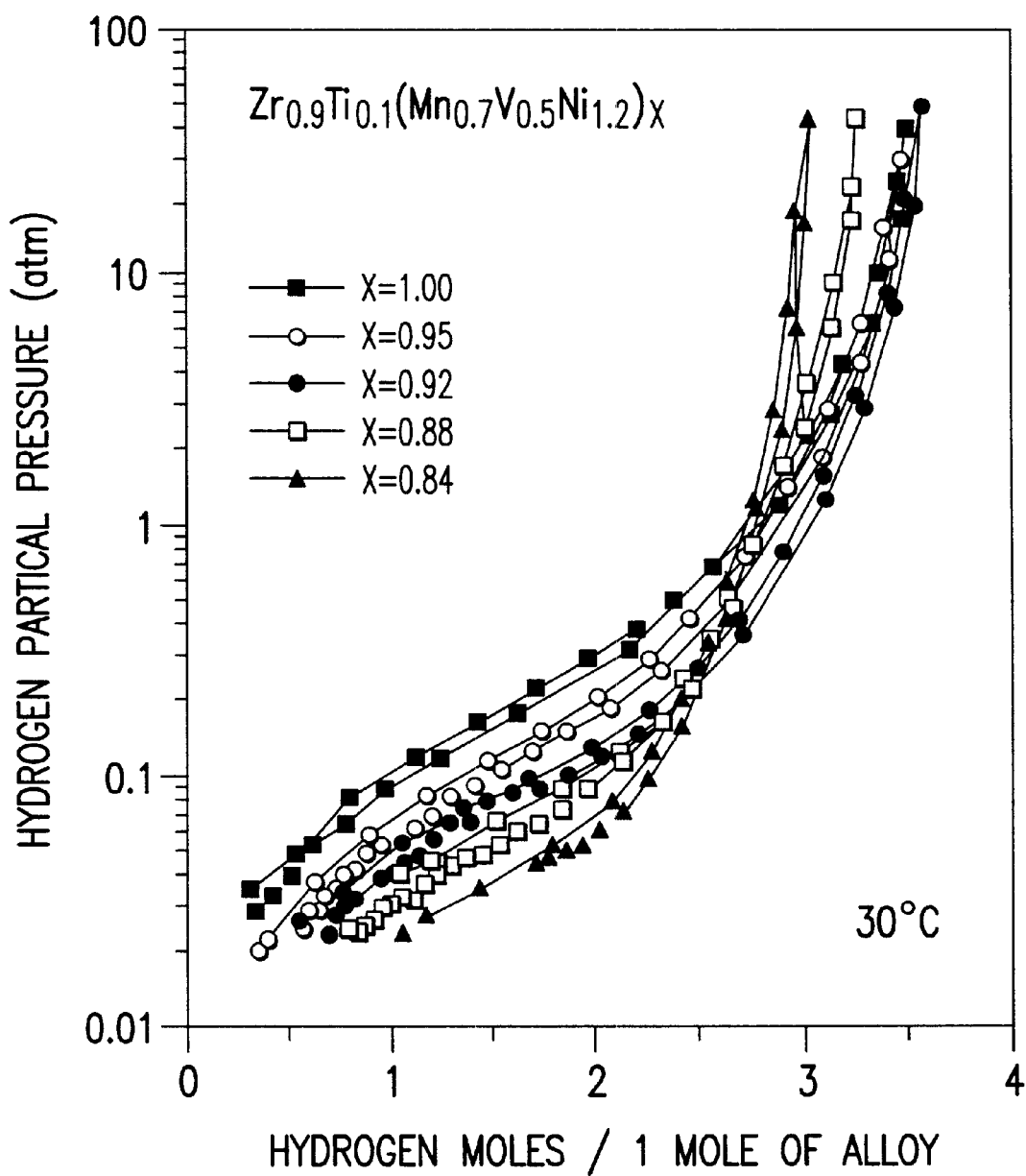
FIG. 10 is the PCT curves of alloys $Zr_{0.9}Ti_{0.1}(Mn_{0.7}V_{0.5}Ni_{1.2})_x$ at 30° C.

From the data, it was found that, when the atom fraction of Ti is 0.1, best properties were obtained. That is, $Zr_{0.9}Ti_{0.1}Mn_{0.7}V_{0.5}Ni_{1.2}$ has a theoretical discharge capacity of approximately 418 mAh/g and a discharge efficiency of approximately 87% at a discharge current density of 300 mA/g. cl EXAMPLE IV Properties of Alloys $Zr_{0.9}Ti_{0.1}(Mn_{0.7}V_{0.5}Ni_{1.2})_x$ In order to further increase the discharge capacity of the alloy of Example III, the atom fractions of Mn, V and Ni were reduced. The alloys $Zr_{0.9}Ti_{0.1}(Mn_{0.7}V_{0.5}Ni_{1.2})_x$ (x=0.0, 0.95, 0.92, 0.88, 0.84) thus prepared, were used to obtain PCT curves, which are shown in FIG. 10. As seen, the hydrogen storage capacity and equilibrium pressure decreases as the value of x decreases.

Measurements were done for the theoretical discharge capacity and the practical discharge capacity of the alloys $Zr_{0.9}Ti_{0.1}(Mn_{0.7}V_{0.5}Ni_{1.2})_x$ (x=0.0, 0.95, 0.92, 0.88, 0.84), which are respectively shown in the following Table 1 and FIG. 11.

TABLE I

| X | Theor. Discharge Capa. (mAh/g) |
|---|---|
| 1.0 | 416 |
| 0.95 | 429 |
| 0.92 | 443 |
| 0.88 | 416 |
| 0.84 | 402 |

As the value of x decreases, the theoretical discharge capacity is increased to a maximal point and decreased therefrom. That is, the data of Table 1 demonstrates that the highest discharge capacity is accomplished by an alloy $Zr_{0.9}Ti_{0.1}(Mn_{0.7}V_{0.5}Ni_{1.2})_{0.92}$.

Figure 11:
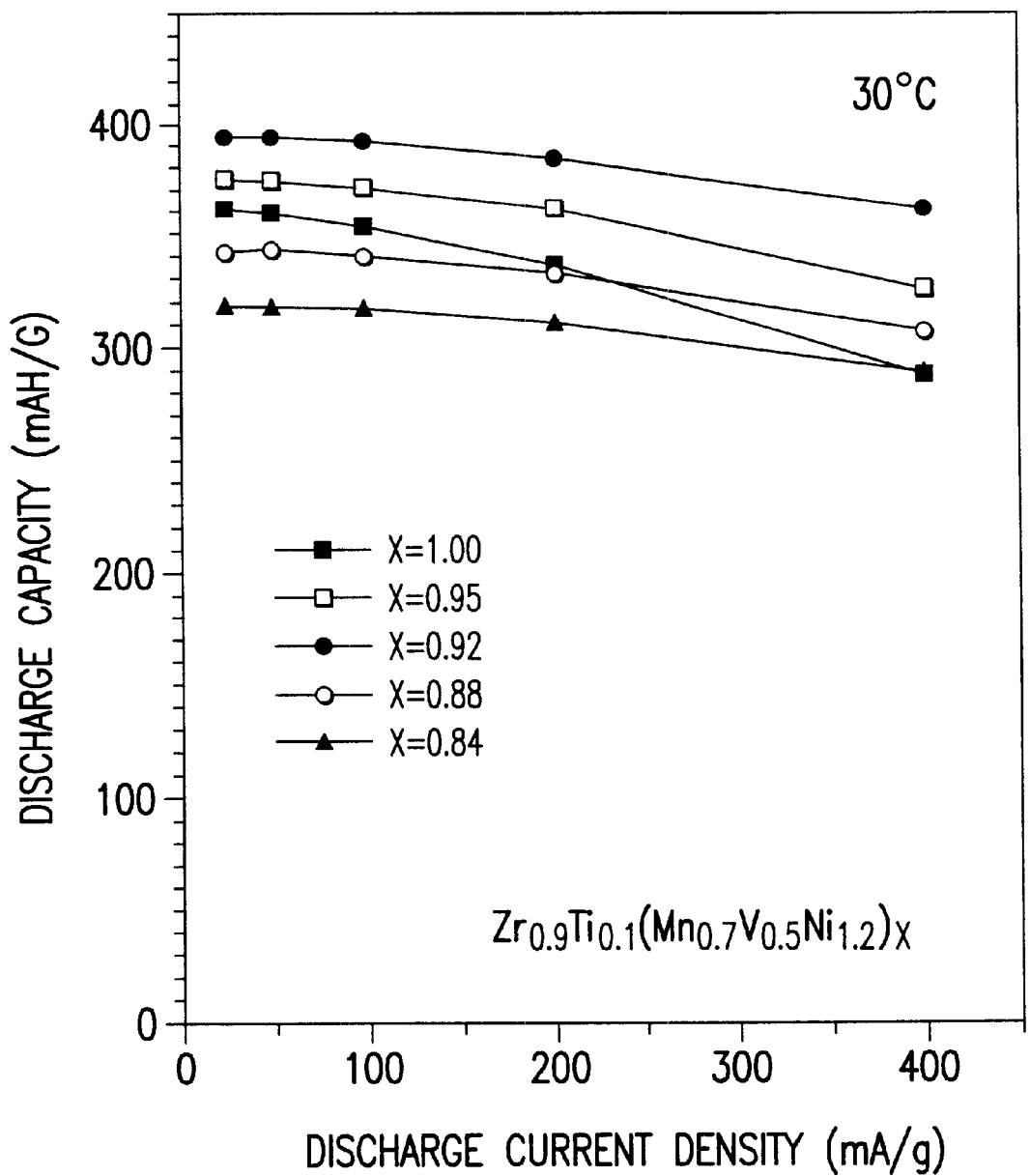
FIG. 11 is a graph showing the rate capabilities of alloys $Zr_{0.9}Ti_{0.1}(Mn_{0.7}V_{0.5}Ni_{1.2})_x$, plotted with respect to discharge current density at 30° C.

As apparent from the PCT curves of FIG. 11, the alloy composition $Zr_{0.9}Ti_{0.1}(Mn_{0.7}V_{0.5}Ni_{1.2})_{0.92}$ is of better discharge capacity than any other alloy compositions. For example, it has a discharge capacity of approximately 394 mAh/g at a discharge current density of 100 mA/g with a calculated discharge capability of 92%.

As described here before, the Zr-based hydrogen storage alloys of the present invention show a high discharge capacity ranging from approximately 300 to 400 mAh/g and a high rate capability of at least 80%. Consequently, the Zr-based hydrogen storage alloys are suitable for use as active anode materials for Ni—MH secondary cells by virtue of their high performance and high capacity The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A hydrogen storage alloy, represented by the following formula I, which consists essentially of the following components:

$$Zr_{1-x}Ti_x(Mn_uV_vNi_y)_z \qquad I$$

wherein x, u, v, y and z each represent:

$0 < x \leq 0.2$, $0.5 \leq u \leq 0.7$, $0.5 \leq v \leq 0.7$, $1.0 \leq y \leq 1.4$, and $0.84 \leq z \leq 1.0$; wherein the components have a ratio of $0 < Ti/Zr \leq 0.25$ and a ratio of $0.72 \leq Mn/V \leq 1.4$.

2. A hydrogen storage alloy as set forth in claim 1, wherein said hydrogen storage alloy is selected from the group consisting of $Zr_{0.9}Ti_{0.1}(Mn_{0.7}V_{0.5}Ni_{1.2})_{0.95}$, $Zr_{0.9}Ti_{0.1}(Mn_{0.7}V_{0.5}Ni_{1.2})_{0.92}$, $Zr_{0.9}Ti_{0.1}(Mn_{0.7}V_{0.5}Ni_{1.2})_{0.88}$, $Zr_{0.9}Ti_{0.1}(Mn_{0.7}V_{0.5}Ni_{1.2})_{0.84}$, $Zr_{0.9}Ti_{0.1}(Mn_{0.7}V_{0.5}Ni_{1.2})$, $Zr_{0.85}Ti_{0.15}(Mn_{0.7}V_{0.5}Ni_{1.2})$, and $Zr_{0.8}Ti_{0.2}(Mn_{0.7}V_{0.5}Ni_{1.2})$.

3. An electrode comprising the hydrogen storage alloy of claim 1.

4. An electrochemical cell which comprises:

the hydrogen storage alloy electrode of claim 3;

a counter electrode of platinum or nickel; and approximately 30 wt % KOH electrolyte.

5. A hydrogen storage alloy as set forth in claim 1, which is $$Zr_{0.9}Ti_{0.1}(Mn_{0.7}V_{0.5}Ni_{1.2})_{0.92}$$

and wherein the alloy shows a discharge capacity of approximately 394 mAh/g at a discharge current density of 100 mA/g with a calculated discharge capacity of 92%.

6. A hydrogen storage alloy as set forth in claim 1, wherein the alloy shows a discharge capability of approximately 300 to 400 mAh/g and a high rate of capability of at least 80%.

* * * * *